United States Patent [19]
Doss

[11] Patent Number: 4,769,940
[45] Date of Patent: Sep. 13, 1988

[54] SPINNER BAIT WITH AN IMPROVED LIP MEMBER

[76] Inventor: Allen J. Doss, 4821 N. Broadway, Knoxville, Tenn. 37918

[21] Appl. No.: 39,923

[22] Filed: Apr. 20, 1987

[51] Int. Cl.⁴ ............................................. A01K 85/00
[52] U.S. Cl. .................... 43/42.13; 43/42.16; 43/42.5
[58] Field of Search ............... 43/42.13, 42.16, 42.17, 43/42.18, 42.26, 42.28, 42.45, 42.5, 42.51

[56] References Cited

U.S. PATENT DOCUMENTS

| | | | |
|---|---|---|---|
| 1,921,657 | 8/1933 | Catarau | 43/42.5 |
| 2,471,499 | 5/1949 | Shipman | 43/42.13 |
| 2,486,626 | 11/1949 | Arbogast | 43/42.28 |
| 2,886,914 | 5/1959 | Lievense | 43/42.5 |
| 3,143,824 | 8/1964 | Thomas | 43/42.26 |
| 4,074,454 | 2/1978 | Cordell | 43/42.28 |
| 4,571,877 | 2/1986 | Montgomery | 43/42.13 |
| 4,619,068 | 10/1986 | Wotawa | 43/42.13 |
| 4,625,448 | 12/1986 | Borders | 43/42.13 |
| 4,638,586 | 1/1987 | Hall | 43/42.13 |
| 4,640,041 | 2/1987 | Stanley | 43/42.13 |

*Primary Examiner*—M. Jordan
*Attorney, Agent, or Firm*—Pitts and Brittian

[57] ABSTRACT

A spinner bait (10) having an improved lip member (32) is provided. The bait includes a wire form (12) having a first section (14) which carries a blade (16) proximate its end portion. A hook (24), head (28) and skirt (30) are carried on the further section (20) of the wire form (12) to simulate live bait. The lip member (32) is mounted on the wire form (12) proximate the head. This lip member (32) serves to cause the bait (10) to dive and run deep while maintaining the bait balance and thus eliminating rolling and tumbling. The angle which the lip portion (34) forms with the longitudinal axis of the bait head can be adjusted to vary the depth of the run.

5 Claims, 1 Drawing Sheet

SPINNER BAIT WITH AN IMPROVED LIP MEMBER

DESCRIPTION

1. Technical Field

This invention relates generally to artificial fishing lures and more particularly to spinner bait commonly used in fishing for bass, pike, muskey, or the like.

2. Background Art

It will be appreciated by those skilled in the art that spinner bait is commonly used for bass and other types of fishing. Conventionally, such baits include a wire form having a midsection capable of being connected to a suitable snap or line. One section of the wire form carries a blade and the other section of the wire form carries a hook with a suitable head and hook dressing.

It is an object of the present invention to provide a spinner bait with an improved lip member which causes the bait to dive and run deep.

Another object of the present invention is to provide such an improved lip member which can be readily fabricated from a sheet metal material and easily installed for retrofit applications.

DISCLOSURE OF THE INVENTION

Other objects and advantages will be obvious, and will in part appear hereinafter, and will be accomplished by the present invention which provides a spinner bait having an improved lip which serves to cause the bait to dive and run deep. The spinner bait includes a wire form having a first section which carries a blade and a further section which carries a hook, head and skirt or other suitable hook dressing. A lip member includes a forward or lip portion which is mounted proximate the head of the hook and serves to cause the bait to dive. This lip member is readily mounted on the bait with a suitable connector member which is integrally formed in the preferred embodiment with the lip portion. The lip member is fabricated, preferably from a sheet metal material in a design which can be bent at a preselected location such that the lip forms a desired angle with the bait head and/or second section of the wire form upon which it is mounted. Further, the design of the lip member is such that it includes a connector which readily secures the lip member to the bait proximate the head.

BRIEF DESCRIPTION OF THE DRAWINGS

The above-mentioned features of the present invention will be more clearly understood from consideration of the following description in connection the with accompanying drawings in which.

BEST MODE FOR CARRYING OUT THE INVENTION

Figure 1:
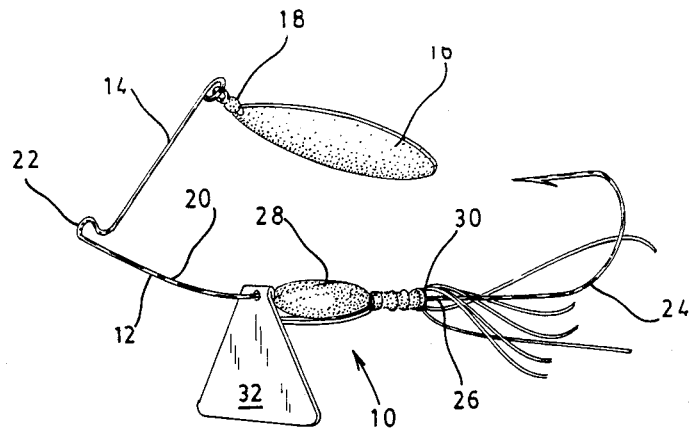
FIG. 1 is a perspective view of an improved spinner bait constructed in accordance with various features of the present invention.

Referring now to the Figures, a spinner bait having an improved lip member constructed in accordance with various features of the present invention is illustrated generally at 10 in FIG. 1. More specifically, the spinner bait 10 includes a wire form 12 having a first section 14 which carries a blade 16 proximate the outboard end portion of section 14. It will be noted that the blade 16 is rigged with a ball bearing swivel 18 to enhance the blade action. The wire form 12 includes a second or further section 20 which is integrally formed with the first section 14 in an open throated design at location 22 which is suitable for being connected to a snap or the like. The further section 20 of the wire form carries a hook 24 which has a shank 26 that is joined with the distal end portion of the wire form section 20.

A head 28 is mounted proximate the hook shank 26. This head can assume various geometries simulating different types of live bait. In embodiments in which the second section 20 and the hook shank 26 are not integrally formed, the head can serve to join these members. A hook dressing or skirt 30 is provided proximate the rearward portion of the head and is carried by the hook shank 26.

Figure 3:
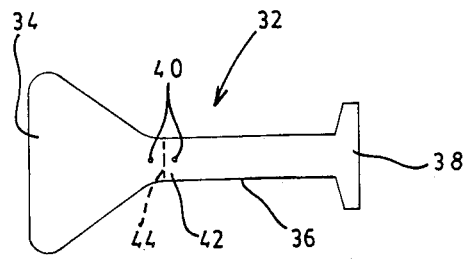
FIG. 3 is a plan view of the lip member as it is fabricated from a suitable sheet metal material or the like prior to its being formed for mounting onto a spinner bait.
Figure 2:
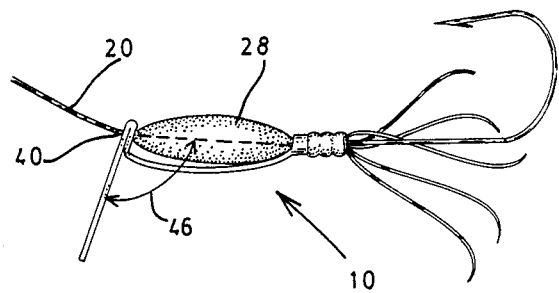
FIG. 2 is a side elevation view of the spinner bait shown in FIG. 1.

A lip member 32 is mounted on the further section of the wire form 12 proximate the forward portion of the bait head 28 as is shown in FIGS. 1 and 2. This lip member 32 serves to cause the spinner bait to dive and to run proximate the bottom of the body of water or river in which the bait is used. In the preferred embodiment, the lip member 32 is cut from a sheet metal material and assumes the planar form as is shown in FIG. 3. This lip member 32 includes a forward or lip portion 34 having an enlarged cross-sectional area. In the embodiment shown in the Figures, this enlarged area is substantially triangular in shape. However, it will be recognized by those skilled in the art that differing geometries may be used. The lip portion 34 is integrally formed with a connector portion 36. This connector portion 36 is elongated and terminates at its distal end in a pinch-on tab section 38. The connector portion is preferably of a lesser width than the bait head, so the head is not significantly camouflaged by the overlaying portion of the connector portion 36 of the lip member.

In the preferred method of fabrication, after the lip member 32 is cut from a sheet metal material as is shown in FIG. 3, the openings 40 are produced proximate the location 42 at which the connector portion 36 is integrally formed with the lip portion 34. The planar lip member 32 is then folded along a line 44 which is substantially midway between the spaced openings 40. In the preferred embodiment, the folded section is then crimped to form the shape shown in FIG. 2. This fold can be more readily seen in FIG. 2. Thus, the openings 40 register and are capable of receiving the further section 20 of the wire form 12 therethrough as is shown in FIG. 2. After threading the registering openings 40 onto the section 20 of the wire form, the connector portion 36 of the lip member 34 is bent over the head 28 of the bait until the pinch-on tab section 3 is positioned proximate the rearward portion of the head 28. At this point, the pinch-on tabs are bent about the wire form proximate the shank 26 of the hook rearward of the head 28 thus firmly securing the lip member 32 onto the wire form.

It will be noted that the lip member is substantially symmetric about its longitudinal axis such that the addition of the lip member to the spinner bait will not alter the bait balance or cause the bait to roll or tumble as it is pulled through the water. Further, while an embodiment has been described in which the lip member 32 is fabricated from the suitable sheet metal material, it will be recognized by those skilled in the art that the lip member could be fabricated from a suitable plastic material provided suitable connection means are substituted for the pinch-on tab section 38.

From the foregoing detailed description, it will be recognized that an improved spinner bait has been provided. This spinner bait includes a lip member which can be readily fabricated and mounted onto a spinner bait of conventional design. The lip member serves to cause the bait to dive and run deep while maintaining the bait balance. The lip member can be readily fabricated from a suitable sheet metal material, and bent such that the lip portion 34 of the bait forms a preselected obtuse angle 46 as is shown in FIG. 2 with the longitudinal axis of bait head 28. It will also be noted that an obtuse angle is formed between the lip portion and the elongated connector portion 36 of the lip member. This angle can be adjusted by bending the lip portion, to adjust the depth of the bait run. Further, the bait can be readily mounted onto a wire form for retrofit application or integrally formed with a spinner bait at the time of the initial manufacturing process.

Thus, although there has been described to this point particular embodiments of the present invention of an improved spinner bait, it is not intended that such specific references be considered as limitations upon the scope of this invention except insofar as set forth in the following claims.

I claim:

1. An improved spinner bait comprising:
   a wire form having a first section and a second section which are integrally connected;
   a blade mounted on said first section of said wire form proximate the distal and portion thereof;
   a hook having a shank joined with the distal end portion of said second section of said wire form;
   a head mounted on said second section of said wire form proximate said shank of said hook, said head having a forward end portion and a rearward end portion;
   a lip member mounted proximate said forward end poriton of said head, said lip member being an integrally formed lip portion and connector portion, said lip portion serving to cause said spinner bait to dive and run deep, said connector poriton having a first end at said lip portion, a midsection which extends over said head, and a further end, said first end of said connector portion provided with an aperture to receive said second section of said wire form therethrough, said further end of said connector portion provided with a pair of pinch-on tab portions to embrace said second section of said wire form proximate said rearward end of said head.

2. The improved spinner baid of claim 1 wherein;
   said lip portion defines an enlarged cross-sectional outline and forms an obtuse angle with the longitudinal axis of said bait head when mounted on said second section of said wire form,
   said lip member having a consistency such that said lip portion is capable of being bent and changed to allow said operator to control depth or dive of said spinner bait; and
   said spinner bait further comprising a skirt mounted on second section of said wire form proximate said shank of said hook.

3. An improved spinner bait of the type having a wire form having a first section and a second section, a blade mounted to said first section of said wire form, a hook having a shank joined with a distal end portion of said second section of said wire form, a head mounted proximate the shank of said hook on said second section of said wire form, a skirt mounted on said second section of said section of said wire form proximate to said shank of said hook, the improvement comprising:
   a lip member including a lip portion and a connector portion having a first end integrally joined to said lip portion, said lip portion serving to cause said spinner bait to dive and run deep, said connector portion at said first end provided with an aperture to receive said second section of said wire form proximte a forward end portion of said head, said connector portion further provided with pinch-on tab portions at a further end to embrace said second section of said wire form proximate a rearward end portion of said head.

4. The improved spinner bait of claim 3 wherein:
   said lip portion defines an enlarged cross-section outline which forms an obtuse angle with the longitudinal axis of said bait head when mounted on said second section of said wire form;
   and said lip member is provided with adjustment means such that an operator can control the depth and dive of said spinner bait.

5. The improved spinner bait of claim 4 wherein:
   said lip portion can be bent relative to said connector poriton to adjust said obtuse angle formed between said lip portion and the longitudinal axis of said bait head so that the depth of said spinner bait run can be adjusted; and
   said material of said lip member has sufficient ductility which allows said obtuse angle to be changed by said operator to control dive and depth.

* * * * *

UNITED STATES PATENT AND TRADEMARK OFFICE
CERTIFICATE OF CORRECTION

PATENT NO. : 4,769,940

DATED : August 30, 1988

INVENTOR(S) : William C. Tuttle

It is certified that error appears in the above-identified patent and that said Letters Patent is hereby corrected as shown below:

Column 17, line 4;
In claim 2, line 1, delete numeral "1" and insert numeral --3--.
Column 17, line 38;
In claim 6, line 1, delete numeral "1" and insert numeral --3--.
Column 17, line 42;
In claim 7, line 1, delete numeral "1" and insert numeral --3--.
Column 21, line 35;
In claim 31, line 1, delete numeral "30" and insert numeral --29--.
Column 21, line 40;
In claim 32, line 1, delete numeral "30" and insert numeral --29--.
Column 22, line 3;
In claim 33, line 1, delete numeral "30" and insert numeral --29--.
Column 22, line 6;
In claim 34, line 1, delete numeral "30" and insert numeral --29--.
Column 22, line 9;
In claim 36, line 1, delete numeral "30" and insert numeral --29--.
Column 22, line 14;

UNITED STATES PATENT AND TRADEMARK OFFICE
CERTIFICATE OF CORRECTION

PATENT NO. : 4,769,940

DATED : August 30, 1989

INVENTOR(S) : William C. Tuttle

It is certified that error appears in the above-identified patent and that said Letters Patent is hereby corrected as shown below:

In claim 36, line 1, delete numeral "30" and insert numeral --29--.
Column 22, line 25;
In claim 38, line 1, delete numeral "36" and insert numeral --37--.
Column 22, line 37;
In claim 40, line 1, delete numeral "30" and insert numeral --29--.
Column 22, line 41;
In claim 41, line 1, delete numeral "30" and insert numeral --29--.

Signed and Sealed this

Tenth Day of March, 1992

Attest:

HARRY F. MANBECK, JR.

*Attesting Officer*     *Commissioner of Patents and Trademarks*